Feb. 26, 1952     J. C. GOLNICK     2,587,311
FISHLINE FLOAT
Filed July 16, 1949
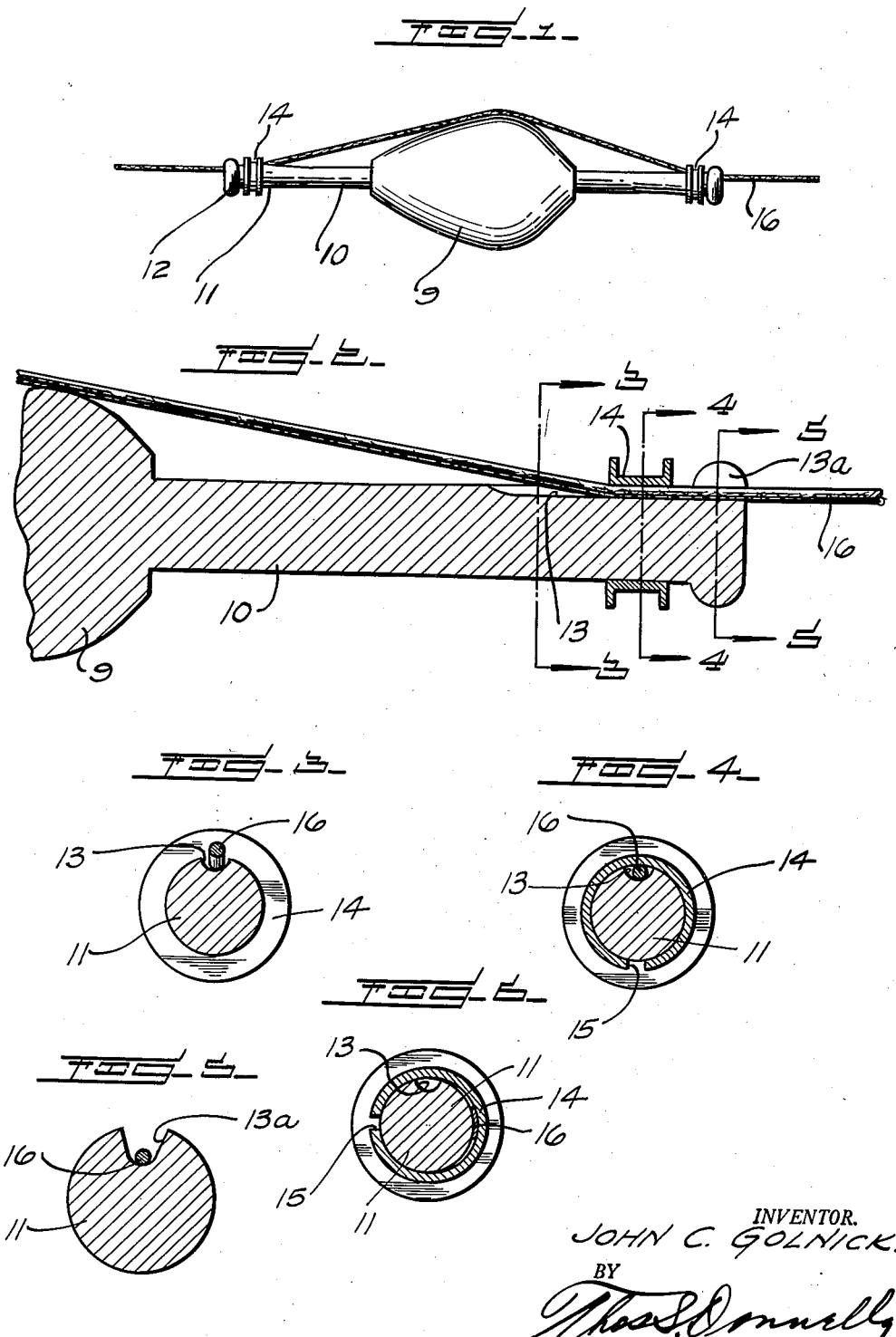

Patented Feb. 26, 1952

2,587,311

UNITED STATES PATENT OFFICE 2,587,311

FISHLINE FLOAT

John C. Golnick, Richmond, Va.

Application July 16, 1949, Serial No. 105,120

2 Claims. (Cl. 43—44.93)

My invention relates to a new, useful improvement in a fish line float, commonly referred to as a bobber.

It is an object of the present invention to provide a float of this class which will be simple in structure, economical of manufacture, durable and highly efficient in use.

Another object of the invention is the provision of a float so arranged and constructed that it may be easily and quickly adjusted to various positions on the fish line.

Another object of the invention is the provision of a float of this class so arranged and constructed that it may be easily and quickly adjusted for free sliding movement on the fish line so that it may be used for casting purposes.

Forming a part of this specification are drawings in which,

Fig. 1 is a side elevational view of the invention,

Fig. 2 is a fragmentary central sectional view of one end of the invention in an enlarged form, Fig. 3 is a sectional view taken on line 3—3 of Fig. 2, Fig. 4 is a sectional view taken on line 4—4 of Fig. 2, Fig. 5 is a sectional view taken on line 5—5 of Fig. 2, Fig. 6 is a sectional view similar to Fig. 4 showing the line in fixed relation to the float.

It is recognized that various modifications and changes may be made in the detail of structure without departing from the invention and it is intended that the presentation herewith is but the preferred embodiment of my invention. In the drawings I have illustrated a float or bobber 9 having a rod 10 projecting outwardly from opposite ends thereof, this rod, adjacent to each of its ends, having a tapered portion 11 terminating in an enlarged head 12. Formed on one side of the stem 10 at the tapered portion is a longitudinally directed peripheral groove 13 which communicates with the slot 13a formed through the head 12. Embracing this stem is a split resilient ring 14 having the space 15 at the opposed edges of the split.

In use, the rings 14 are slid downwardly onto the smaller portion of the stem 10 off of the enlarged tapered portion 11 and the fish line 16 may be passed through the space 15 and the rings 14 rotated so that the bobber or float line is thus mounted on the line 16. When it is desired to move the float or bobber 9 along the line 16 the rings 14 may be slid downwardly onto the narrower portion of the stem 10 off of the tapered portion thus permitting free movement of the bobber or float along the line 16. When it is desired to secure the bobber or float in fixed relation to the line, the line 16 while held out of alignment with the groove 13, is clamped by sliding the ring 14 up onto the tapered portion 11, thus securely squeezing or clamping the line against the stem as shown in Fig. 6.

In use when the rings 14 are slid downwardly onto the smaller part of the stem 10 off of the tapered enlarged portion 11 the float or bobber, of course, would be free for slideable movement on the line 16. However, this could not be used for casting because in use the rings would slide onto the enlarged tapered portion and thus lock the line and float in fixed relation to each other. In order to provide a float of this type so that it may be used for casting purposes and be free for movement on the line 16 I have provided the groove 13 communicating with the slot 13a. When the line 16 is placed in the groove and through the slot 13a as shown in Fig. 2 and the rings 14 slid upwardly onto the enlarged tapered portion so that the rings are in clamping relation to this tapered portion 11, and thus fixed on the stem 10, the float or bobber 9 is free for slideable movement on the line 16 and cannot become locked thereon. When the rings are in this position the float or bobber may be used for casting purposes and the user may know that the bobber is always free for slideable movement on the line 16. With the groove 13 in the stem 10 in aligned communication with the slot 13a in the head 12, the placement of the line 16 in the groove is facilitated, as by holding the line by a thumb or otherwise on the enlarged bobber body 9 and then introducing the line into the slot 13a of the head as a guide for directing the line into the groove 13.

What I claim is new is:

1. A fish line float of the class described, comprising: a buoyant body; a stem projecting outwardly from one end of said body, said stem having a tapered portion with the enlarged end thereof at the outer end of the stem and provided with a longitudinally directed peripheral groove at the tapered portion; a split resilient ring slideably mounted on said stem and adapted upon slideable movement onto the larger part of said tapered portion for clamping against the periphery of said stem and clamping a fish line directed there-through laterally of the groove against the periphery of said stem for retaining said stem in fixed relation to said fish line, there being sufficient clearance between the bottom of said groove and the inner surface of said ring for permitting free sliding movement of said body on a fish line upon engagement of the fish line in said groove; and a head on the end of said stem having a slot formed in its periphery communicating with said groove, whereby a line stretched from the outer side of the buoyant body to the slot in said head will register with the groove in said stem to facilitate reception therein, said head being of larger diameter than the ends of said stem.

2. A fish line float of the class described, comprising a buoyant body; a stem projecting outwardly from one end of said body, said stem having a tapered portion with the enlarged end thereof at the outer end of the stem and provided with a longitudinally directed peripheral groove at the tapered portion; a split resilient ring slidably mounted on said stem and adapted upon slidable movement onto the larger part of said tapered portion for clamping against the periphery of said stem and clamping a fish line directed therethrough laterally of the groove against the periphery of said stem for retaining said stem in fixed relation to said fish line, there being sufficient clearance between the bottom of said groove and the inner surface of said ring for permitting free sliding movement of said body on a fish line upon engagement of the fish line in said groove; and a head on the end of said stem having a slot formed in its periphery communicating with said groove, with the bottom walls of the groove and slot being co-planar whereby a line stretched from the outer side of the buoyant body to the slot in said head will register with the groove in said stem to facilitate reception therein, said head being of larger diameter than the ends of said stem.

JOHN C. GOLNICK.

REFERENCES CITED

The following references are of record in the file of this patent:

UNITED STATES PATENTS

| Number | Name | Date |
| --- | --- | --- |
| 1,010,499 | Kimbrough | Dec. 5, 1911 |
| 2,385,415 | Jackson | Sept. 25, 1945 |

FOREIGN PATENTS

| Number | Country | Date |
| --- | --- | --- |
| 588,753 | France | Feb. 6, 1925 |
| 15,145 | Great Britain | of 1911 |